United States Patent
Klein et al.

[11] Patent Number: 5,277,548
[45] Date of Patent: Jan. 11, 1994

[54] NON-INTEGRAL ROTOR BLADE PLATFORM

[75] Inventors: Harvey L. Klein; Roy R. Starke, both of Palm Beach Gardens, Fla.

[73] Assignee: United Technologies Corporation, Hartford, Conn.

[21] Appl. No.: 816,501

[22] Filed: Dec. 31, 1991

[51] Int. Cl.$^5$ .................................................. F01D 5/22
[52] U.S. Cl. ............................. 416/193 A; 416/220 R; 29/889.21
[58] Field of Search ............ 416/193; 29/889.2, 889.21

[56] References Cited

U.S. PATENT DOCUMENTS

| | | |
|---|---|---|
| 2,656,146 | 10/1953 | Sollinger . |
| 2,749,028 | 6/1956 | Stalker . |
| 2,749,029 | 6/1956 | Goetzel et al. . |
| 2,819,870 | 1/1958 | Wayne . |
| 2,825,530 | 3/1958 | Schum et al. . |
| 2,940,726 | 6/1960 | Dennis . |
| 2,967,043 | 1/1961 | Dennis . |
| 3,114,533 | 12/1963 | Auger . |
| 3,294,364 | 12/1966 | Stanley . |
| 3,393,862 | 7/1968 | Harrison .................. 416/193 A |
| 3,455,537 | 7/1969 | Kozlin et al. ............. 416/220 R |
| 3,471,127 | 10/1969 | Emmerson ................ 416/193 A |
| 3,761,200 | 9/1973 | Gardiner .................. 416/193 A |
| 3,801,222 | 4/1974 | Violette . |
| 3,810,711 | 5/1974 | Emmerson et al. . |
| 3,860,361 | 1/1975 | McMurtry et al. . |
| 3,905,722 | 9/1975 | Guy et al. . |
| 4,019,832 | 4/1977 | Salemme et al. .......... 416/193 A |
| 4,045,149 | 8/1977 | Ravenhall . |
| 5,030,063 | 7/1991 | Berger ..................... 416/220 R |
| 5,049,035 | 9/1991 | Marlin ..................... 416/193 A |
| 5,161,949 | 11/1992 | Brioude et al. ........... 416/193 A |

FOREIGN PATENT DOCUMENTS

| | | | |
|---|---|---|---|
| 989556 | 9/1951 | France ....................... 416/193 A |
| 811922 | 4/1959 | United Kingdom ........... 416/193 A |
| 2006883 | 5/1979 | United Kingdom ........... 416/193 A |
| 1549422 | 8/1979 | United Kingdom ........... 416/193 A |

Primary Examiner—Edward K. Look
Assistant Examiner—James A. Larson
Attorney, Agent, or Firm—Randy G. Henley

[57] ABSTRACT

A non-integral rotor blade platform for a rotary machine is disclosed. Various construction details are developed which disclose a one-piece, non-integral rotor blade platform retained to a live rim area of a disk. In one embodiment, a rotor blade assembly (48) is comprised of a plurality of rotor blades (54) disposed on a disk (44), a plurality of platforms (60), each platform disposed between adjacent rotor blades, and a front cover plate (56) and rear cover plate (58) which, in conjunction, retain the platforms to the disk. In an alternative embodiment, each platform (102) has a supplemental mechanical fastener means (100) to provide additional retention of the platforms to a disk (104).

19 Claims, 5 Drawing Sheets

NON-INTEGRAL ROTOR BLADE PLATFORM

DESCRIPTION

1. Technical Field

The present invention relates to rotary machines and, more particularly, to a non-integral rotor blade platform for a rotary machine.

2. Background Art

A typical rotary machine, such as a turbofan gas turbine engine for an aircraft, includes a fan section and an engine core. A primary flowpath and a secondary flowpath for working fluid extends axially through the engine. The fan section has a fan enclosed within a casing which defines the secondary flowpath. The fan transfers energy, in the form of increased momentum, to working fluid as the fluid is flowed along the secondary flowpath. Increasing the momentum of the working fluid produces forward thrust for the engine.

The primary flowpath is radially inward of the secondary flowpath and extends axially through the fan section and the engine core. The engine core includes a compressor, a combustor, and a turbine. A portion of the flow of working fluid is axially conducted through the engine core. In the compressor, an array of compressor rotor blades transfers energy, in the form of increased momentum, to the working fluid. This energy transfer also produces forward thrust. In the combustor, fuel is added to the compressed working fluid and burned to add more energy to the fluid. The working fluid and fuel mixture is then expanded through an array of turbine rotor blades in the turbine. The expanding fluid transfers energy to the turbine rotor blades. This energy drives one or more rotor shafts which interconnect the fan and compressor with the turbine. The energy extracted from the working fluid in the turbine is used to drive the fan and compressor.

Each rotor blade in the fan section and the compressor is comprised of two portions, an airfoil portion and a root portion. The airfoil portion provides a flow surface which interacts with the working fluid to transfer energy to the fluid. The root portion attaches the rotor blade to a rotatable disk driven by the rotor shaft.

Efficiency of the energy transfer, and thereby the overall efficiency of the rotary machine, is improved by confining the flow of working fluid to the airfoil portion of the rotor blade. This is accomplished by using an outer casing and a plurality of blade platforms. The outer casing is in close proximity to the radially outer edge or tip of the rotor blade and provides a radially outer flow surface. The blade platforms are located at the base of the airfoil portion of the rotor blade and provide a radially inner flow surface. Together the outer casing and platforms form an annular passage which confines the working fluid to the airfoil portion of the rotor blade.

The platforms also protect the root portion and the disk. The platforms provide means to prevent working fluid from coming into contact with the root portion of the rotor blade and the disk. By sealing off the root portion of the rotor blade and the disk, the platforms provide protection from possible damage due to contact with working fluid.

Platforms in the prior art have been designed as an integral part of the rotor blade. An integral platform introduces several limitations into the design of the rotor blade. During operation of the rotary machine, rotational force increases the loading attributed to the presence of the integral platform on the rotor blade. This loading causes significant stress in the rotor blade. A larger root portion is required to accommodate the stress. Increasing the size of the root portion increases the overall weight of the rotor blade. In addition, the increased size of the root portion reduces the number of rotor blades. The increased weight and reduction in the number of rotor blades reduces the efficiency of the energy exchange.

It is now well known to design the platform and rotor blade as separate assemblies. A rotor blade with a non-integral platform removes the loading of the platform from the rotor blade. The rotor blade can then be reduced in size and weight. In this arrangement each rotor blade and each platform are retained by the disk. Due to the limited space available in a rotary machine, however, many of the disclosed non-integral rotor blade and platforms have consisted of arrangements in which the rotor blade and platform have shared a retaining mechanism.

One type of non-integral rotor blade and platform arrangement disclosed in the prior art has a root portion on each platform and on each rotor blade. The root portions are disposed in slots to retain the rotor blades and platforms. U.S. Pat. No. 2,967,043, issued to Dennis, entitled "Blades and Blade Mounting Assemblies for Turbines and Axial Flow Compressors", discloses a platform having a root portion retained within a hollowed out root portion of the rotor blades which are retained within a slot on the disk. A similar arrangement is disclosed by U.S. Pat. No. 2,656,146, issued to Sollinger, entitled "Turbine Blade Construction". Sollinger, however, discloses a rotor blade root retained within a platform root which is retained within a retaining slot on the disk.

In an alternate type of non-integral rotor blade and platform arrangement, the platform root consists of upstream and downstream extensions which conform to the cross-sectional shape of the rotor blade root. The extensions overlay the upstream and downstream faces of the rotor blade root. U.S. Pat. No. 2,940,726, issued to Dennis, entitled "Hollow Blades for Turbines and the Like", discloses a rotor blade root having a fir-tree shape and a platform with fir-tree shaped extensions. Both the rotor blade root and platform extensions slide into a complementary slot in a disk to retain the rotor blade and platform. U.S. Pat. No. 3,801,222, issued to Violette, entitled "Platform for Compressor or Fan Blade", discloses platform extensions and rotor blade roots which are both dove-tail shaped. Each rotor blade root and platform extension slides into a corresponding slot in the disk.

Although the shared retaining mechanism arrangement is space efficient, it creates areas of high stress on the disk in the region between the retaining slots. The presence of the retaining slots on the radially outer edge of the disk creates a circumferentially discontinuous area of the disk. This area is commonly referred to as a "dead rim" area. An element of the disk located in a circumferentially continuous portion, or "live rim" area, of the disk receives structural support from circumferentially adjacent elements and from a radially inward element. An element between the slots, however, does not receive any structural support from the circumferentially adjacent slots. All the rotational loads in this region are therefore transferred to the adjacent region located radially inward. This concentration of loads creates an area of high stress in this region of the disk. These areas of high stress require either the disk to be enlarged to accommodate the stress or the number of rotor blades to be reduced. Either alternative reduces the efficiency of the rotary machine.

Additionally, the shared retaining mechanism increases the complexity of the assembly procedure. One typical procedure requires each stage of rotor blades to be inserted into the disk simultaneously. An alternate procedure permits each rotor blade and its adjacent platform sections to be inserted simultaneously. The latter procedure, however, requires each platform between adjacent rotor blades to be sectioned into two or more portions. Sectioning the platforms between rotor blades increases the amount of sealing required around the platforms. The additional sealing increases the likelihood of failure of a seal and increases the risk of damage to the rotor blade root and disk.

Another type of rotor blade and platform arrangement is disclosed by U.S. Pat. No. 3,294,364, issued to Stanley, entitled "Rotor Assembly". Stanley discloses a rotor blade with a dove-tail shaped root portion retained within a rotor blade retaining slot. The platform also has a dovetail shaped root portion which is retained within a separate, platform retaining slot on the disk. The disk has alternating, adjacent rotor blade retaining slots and platform retaining slots. Although the arrangement disclosed by Stanley maintains separate retaining mechanisms for the platform and the rotor blade, it has several practical limitations. The first is the lack of space available on the disk for the multiplicity of adjacent retaining slots for both the platforms and the rotor blades. To produce slots of sufficient strength to retain the platforms and rotor blades, under the rotational loading encountered in practical applications, either the disk size would have to be increased or the number of rotor blades reduced. In addition, the structure of Stanley places the rotational loading of both the rotor blades and the platforms in the dead rim area of the disk. This arrangement creates a region of high stress. Another limitation results from the curvature of the rotor blades and the complementary edges of the adjacent platforms. Due to this curvature, each rotor blade and the adjacent platforms on either side must be inserted onto the disk at the same time. This requires that each platform be split into two sections. As mentioned previously, splitting the platforms into sections requires additional sealing between the sections of the platform and, in addition, increases the complexity and weight of each platform.

The above art notwithstanding, scientists and engineers under the direction of Applicants' Assignee are working to develop rotor blade and platform assemblies which increase the efficiency of the energy transfer in the compressor section of a rotary machine.

DISCLOSURE OF THE INVENTION

An object of the invention is a one-piece, nonintegral rotor blade platform between adjacent rotor blades.

Another object of the invention is a nonintegral rotor blade platform with a retaining mechanism separate and independent from the retaining mechanisms for adjacent rotor blades.

A further object of the present invention is a rotor blade assembly having a plurality of nonintegral rotor blade platforms structurally supported by a live rim area of a disk.

According to the present invention, a rotor blade assembly, having a plurality of rotor blades disposed on a disk and a one-piece, non-integral platform extending between each pair of rotor blades, includes means to engage the platform with the live rim area of the disk to retain the platforms to the disk.

According to a specific embodiment, a rotary machine includes a rotatable disk by having a plurality of rotor blade retaining slots, a rotor blade assembly having a plurality of rotor blades engaged with the blade retaining slots, a corresponding number of platforms, a front cover plate, and a rear cover plate, wherein the front cover plate and the rear cover plate engage the platforms and live rim area of the disk to retain the platforms to the disk.

In an alternate embodiment of the present invention, mechanical fastening means is disposed between a platform and a disk in order to provide a supplemental retaining mechanism for the platform.

According further, a method of installing a rotor blade assembly having a plurality of rotor blades, a corresponding number of platforms, a front cover plate, and a rear cover plate, to a disk having a corresponding plurality of rotor blade retaining slots, is comprised of the following steps: first, positioning the rear cover plate downstream of the disk; second, inserting the rotor blades into the rotor blade retaining slots; third, radially positioning a platform between adjacent rotor blades and engaging each platform with the rear cover plate; fourth, positioning the front cover plate upstream of the disk and engaging the front cover plate with the platforms; and fifth, fastening the front and rear cover plates to the disk.

For the alternate embodiment having mechanical fastening means for supplemental retention, additional steps are necessary to install a rotor blade assembly to the disk. Prior to engaging the cover plates with the platforms, the mechanical fastener must be engaged with the platform and disk.

According further still, a method of securing a rotor blade assembly, having a plurality of rotor blades and a corresponding number of platforms, to a disk having a retaining means adapted to secure rotor blades to the disk, is comprised of the following steps: first, attaching each rotor blade to the disk; second, disposing a platform between each pair of adjacent rotor blades; third, attaching one axial end of the platform to the live rim area of the disk; and fourth, attaching the other axial end of the platform to the live rim area of the disk.

A principal feature of the present invention is the one-piece, non-integral platform located between each pair of rotor blades. Another feature is the retaining mechanism for the platforms which permits the platforms to be retained to a live rim area of the disk by engagement with the front and rear cover plates. A further feature is the tongue and groove engagement between the platforms and the front and rear cover plates.

Advantages of the present invention include the level of efficiency of the engine and the flexibility of design which results from using a non-integral platform. A non-integral platform reduces the size and weight of the rotor blades eliminating the stress in the blade attributable to the platform. Separate platforms and rotor blades also reduces weight by permitting the selection of various composite and non-composite materials for the rotor blades and platforms.

Another advantage of the present invention is the level of efficiency of the engine which results from shifting the load of the platforms from a dead rim area to a live rim area of the disk thereby reducing the stress concentration in the dead rim area. A still further advantage of the present invention is the ease of assembly which results from the tongue and groove engagement between the platforms and the front and rear cover plates which permits each individual platform to be positioned radially.

The foregoing and other objects, features and advantages of the present invention will become more apparent in light of the following detailed descriptions of exemplary embodiments thereof, and as illustrated in the accompanying drawings.

BEST MODE FOR CARRYING OUT THE INVENTION

Figure 1:
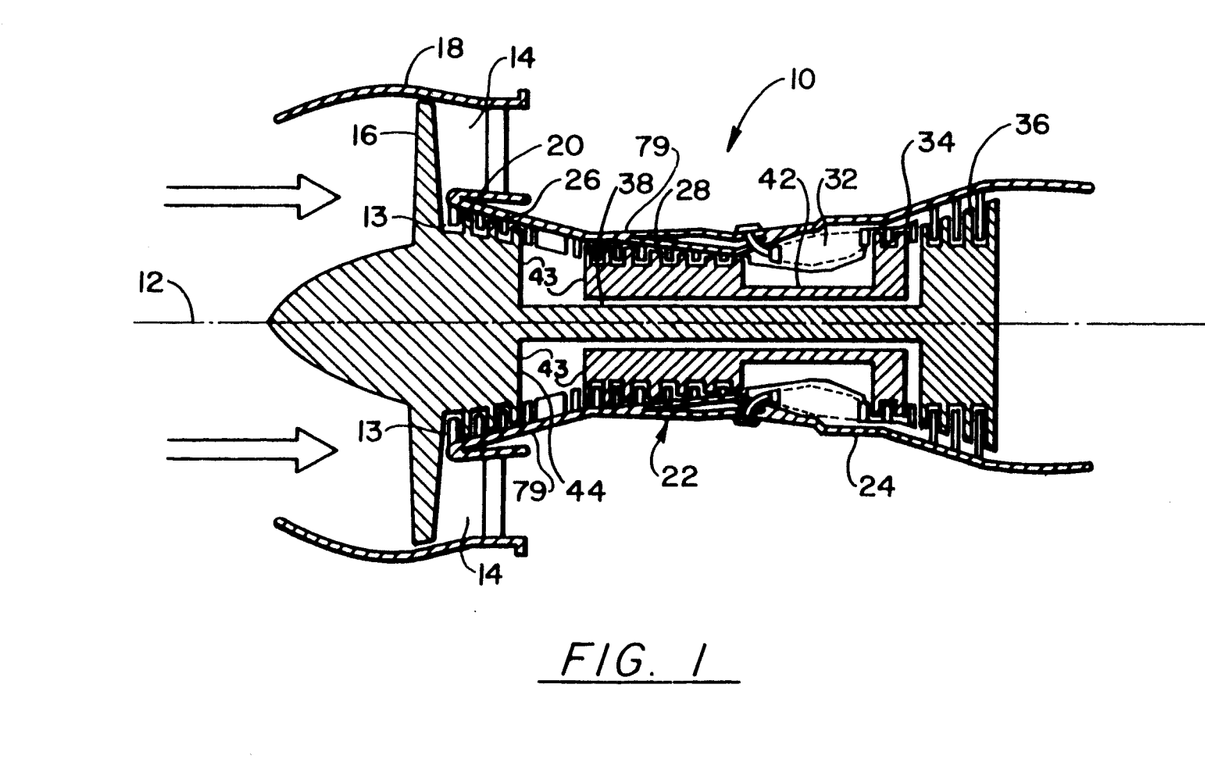
FIG. 1 is a cross-sectional view of a rotary machine.

FIG. 1 is an illustration of a rotary machine 10 circumferentially extending about a longitudinal axis 12 and having a primary flowpath 13 and a secondary flowpath 14 for conducting working fluid through the rotary machine 10. The rotary machine 10 includes a fan 16 encompassed by a fan case 18 and an engine core 22 encompassed by an outer casing 24. The engine core 22 includes a low pressure compressor 26, a high pressure compressor 28, a combustion section 32, a high pressure turbine 34, and a low pressure turbine 36. The fan 16 and low pressure compressor 26 are connected to, and driven by, a low pressure rotor shaft 38 connected to the low pressure turbine 36. The high pressure compressor 28 is connected to, and driven by, a high pressure rotor shaft 42 connected to the high pressure turbine 34.

Figure 2:
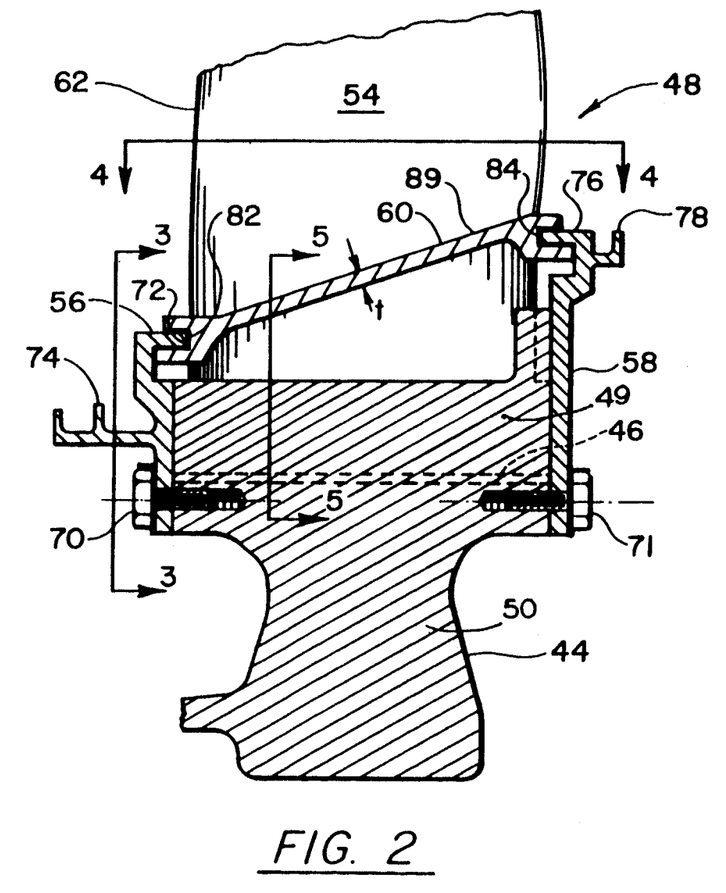
FIG. 2 is a cross-sectional view of a rotor blade assembly.
Figure 3:
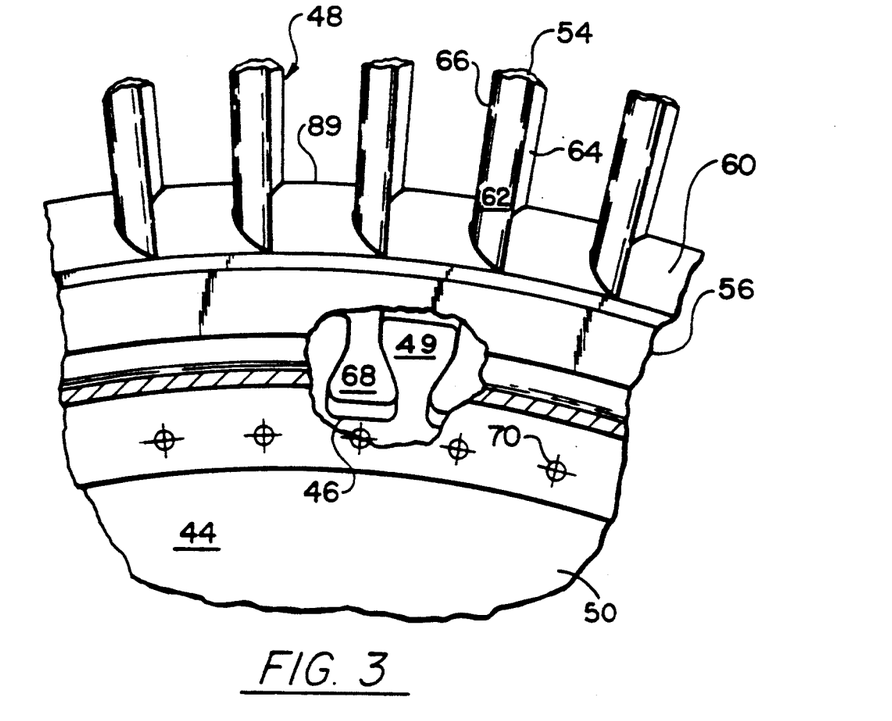
FIG. 3 is a view taken along line 3—3 of FIG. 2, partially broken away to illustrate the retention of a rotor blade and front cover plate.

Referring now to FIGS. 2 and 3, both compressor sections 26, 28 include a rotor assembly 43. Each rotor assembly 43 is comprised of a plurality of rotatable disks 44 and a rotor blade assembly 48 mounted on each disk 44. Each disk includes an outer portion 49 having a plurality of retaining slots 46 and an inner portion 50 which is circumferentially and radially continuous. The primary flowpath 13 is defined by the separation between the outer casing 24 and the rotor blade assemblies 48.

Each rotor blade assembly 48 is comprised of a plurality of rotor blades 54, a front cover plate 56, a rear cover plate 58, and a plurality of platforms 60. Each rotor blade 54 has an airfoil portion 62, with a concave pressure surface 64 and a convex suction surface 66, and a root portion 68 which is dove-tail shaped in a circumferential cross-section. The root portions 68 are engaged with the complementary shaped retaining slots 46 disposed on the disk 44. The interaction of the root portion 68 and the retaining slots 46 provides retaining means for the rotor blades 54.

The front cover plate 56 and rear cover plate 58 are annular rings which provide means to retain the platforms 60 to the disk 44 and axially restrain the rotor blades 54 within the retaining slots 46. The front cover plate 56 and rear cover plate 58 are secured to the disk 44 by a fastener means. The fastener means may be any convenient fastener, such as bolts 70, 71 as shown in FIGS. 2 and 3. It should be noted that the fastener means, in this case the bolts 70, 71, are engaged with the inner portion 50 of the disk 44. Locating the fastener means at such a radial position permits the rotational loading of the platforms 60 to be carried by a live rim, or circumferentially continuous, portion of the disk 44. Removing the rotational load of the platforms 60 from a dead rim portion to a live rim portion will help minimize the stress concentration in the region radially adjacent to the dead rim area.

Although FIG. 2 illustrates an embodiment having both the front cover plate 56 and the rear cover plate 58 fastened to a live rim portion of the disk 44, it may be necessary in some embodiments to have one or the other of the cover plates fastened to a dead rim portion of the disk. For instance, space limitations may preclude fastening a rear cover plate to a live rim area of the disk. In this instance, only a portion of the rotational loading of the platforms will be transferred directly to the live rim area. This configuration, while not transferring all of the rotational load of the platforms directly to the live rim area, will remove at least a portion of the platform load from the dead rim area and thereby reduce stress in the dead rim area.

The front cover plate 56 has a downstream facing tongue 72 and a knife-edge seal 74. The rear cover plate 58 has an upstream facing tongue 76 and a knife-edge seal 78. The tongues 72, 76 engage the platforms 60 to provide means for retention of the platform 60 to the disk 44. The knife-edge seals 74, 78 on the front cover plate 56 and rear cover plate 58 provide means for sealing between the rotor blade assembly 46 and axially adjacent stator structure 79 (see FIG. 1). The knife edge-seal 74 on the front cover plate 56 engages stator structure 79 which is axially upstream of the rotor blade assembly 48. The knife-edge seal 78 on the rear cover plate 58 engages stator structure 79 which is axially downstream of the rotor assembly 48. Knife-edge seals are disclosed merely as an illustration of one particular means of sealing between the rotor blade assembly and adjacent structure. Other sealing means, such as brush seals, may be equally applicable to the present invention.

The platforms 60 are positioned at the interface of the airfoil portion 62 and root portion 68 of the rotor blades 54. Each platform 60 includes an upstream facing groove 82 and a downstream facing groove 84. The platforms 60 are retained to the disk 44 through engagement of the grooves 82, 84 with the tongues 72, 76 on the front cover plate 56 and rear cover plate 58 in a conventional tongue and groove arrangement. The tongue and groove structure provides means of attachment for the platforms 60. It should be noted that the tongues 72, 76 extend circumferentially about the axis 12 and therefore the grooves 82, 84 are curved about the axis 12 to complement the curvature of the tongues 72, 76.

Figure 4:
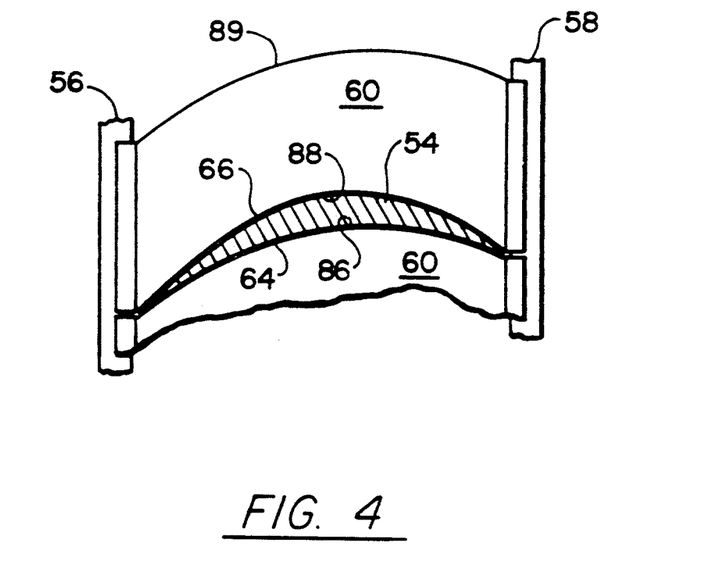
FIG. 4 is a view taken along line 4—4 of FIG. 2, showing a rotor blade and adjacent platforms.

Referring now to FIG. 4, each platform 60 is located between two adjacent rotor blades 54 and has a convex edge 86 which conforms to the pressure surface 64 of one of the adjacent rotor blades 54 and a concave edge 88 which conforms to the suction surface 66 of the other of the adjacent rotor blades 54. Each of the platforms 60 meets up with an adjacent platform in the region just upstream of each rotor blade 54 and in the region just downstream of each rotor blade 54. The plurality of platforms 60 define a radially inner flow surface 89 (see FIGS. 2 and 3) for the primary flowpath 13.

Figure 5:
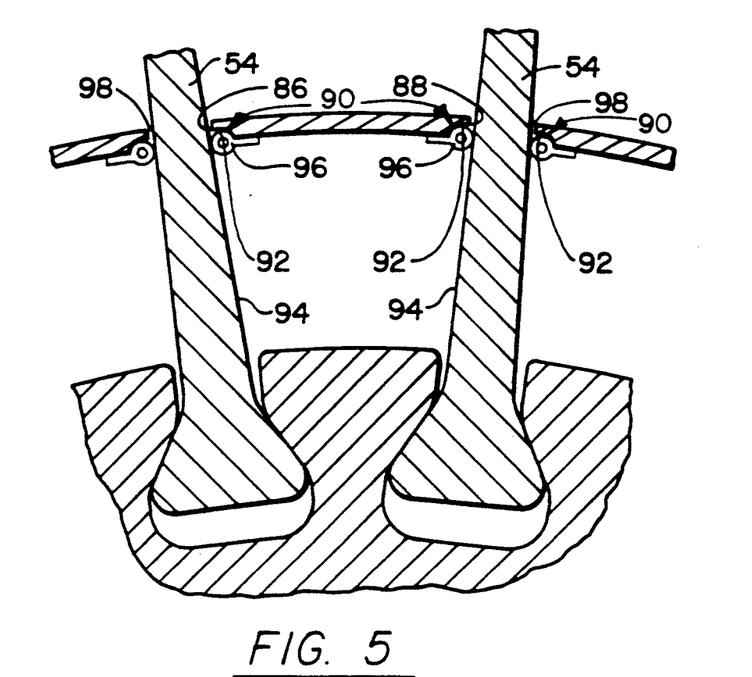
FIG. 5 is a cross-sectional view of a rotor blade assembly taken along line 5—5 of FIG. 2, showing rotor blades and adjacent platforms.

Since the platforms 60 are not integral to the rotor blade 54, sealing means is required to prevent or impede working fluid from passing between each rotor blade 54 and platform 60. Contact with the working fluid may damage the rotor blade root 68 or disk 44. A means of sealing between each rotor blade 54 and platform 60 is illustrated in FIG. 5. Axially extending channels 90 are disposed on the concave edge 88 and the convex edge 86. An axially extending seal 96 is seated in channel 90. Each seal 96 extends across the gap 98 between the platforms 60 and the rotor blade 54 to prevent working fluid from flowing radially inwardly between the channel 90 and the rotor blade 54. The seal 96 is bonded to each channel 90. The seal 96, in its natural condition, has a lateral width greater than the width of the gap 98. This causes the seal 96 to laterally compress and thereby provide a sealing force between the channel 90 and adjacent rotor blade surface 94. Although the sealing means illustrated in FIG. 5 is a satisfactory means of sealing, it should be understood by those skilled in the art that other means of sealing may be used.

The assembly procedure for each rotor blade assembly 48 is simplified by the use of the invention. First, the rear cover plate 58 is slid over the disk 44 and positioned immediately downstream of the disk 44. Second, each rotor blade 54 is slid into a retaining slot 46. Third, each platform 60 is placed into position by radially lowering each platform 60 between a pair of adjacent rotor blades 54 and engaging the downstream facing groove 84 of the platform 60 with the tongue 76 of the rear cover plate 58. Fourth, the front cover plate 56 is positioned onto the disk 44 and the upstream facing groove 82 of the platform 60 is engaged with the tongue 72 of the front cover plate 56. The final step is to fasten the front cover plate 56 and rear cover plate 58 to the disk 44 by engaging bolts 70, 71 with the disk.

A suggested material for the platforms 60 illustrated in FIGS. 1 to 5 is a high modulus, lightweight composite material. Suitable composite materials include, but are not limited to, graphite/polyamide, graphite/epoxy, and boron/aluminum. Since the platforms 60, cover plates 56, 58 and rotor blades 54 are all independent elements, they may be fabricated from different materials. This permits optimizing each part for strength and weight.

During operation, working fluid is flowed along the primary and secondary flowpaths 13, 14. Interaction of working fluid and the rotor blade assemblies 48 transfers energy between working fluid and the disk 44. The platforms 60 and outer casing 24 define the primary flowpath 13 which limits the interaction between working fluid and the rotor blade 54 to the airfoil portion 62 of the rotor blades 54. The seals 96 prevent any of working fluid from passing between the platforms 60 and the rotor blades 54. In addition, the knife-edge seals 74, 78 prevent working fluid from flowing between the rotor blade assembly 48 and axially adjacent stator structure 79.

The engagement of the tongues 72, 76 and grooves 82, 84 provides a retaining force against the rotational force which urges the platforms 60 to move radially outward. The interaction of the rotational force and the retaining forces of the tongues 72, 76 will produce a bending moment in the platform 60. The location of the retaining forces on the upstream facing groove 82 and downstream facing groove 84 will result in a maximum deflection due to bending at the axial center between the retaining forces. To account for this loading the platform 60 may be fabricated to have a maximum thickness t (see FIG. 2) in the axially center region. To minimize the weight of the platforms 60, the thickness of the platforms 60 may be tapered towards the upstream and downstream ends where bending loads should be minimal.

Although the invention as illustrated in the embodiment of FIGS. 1–5 is particularly well suited for using platforms fabricated from composite materials, it may also be practiced with a metallic platform, such as one formed of titanium. In this embodiment, a supplemental retention mechanism may be required to provide additional structural support to the platform.

Figure 6:
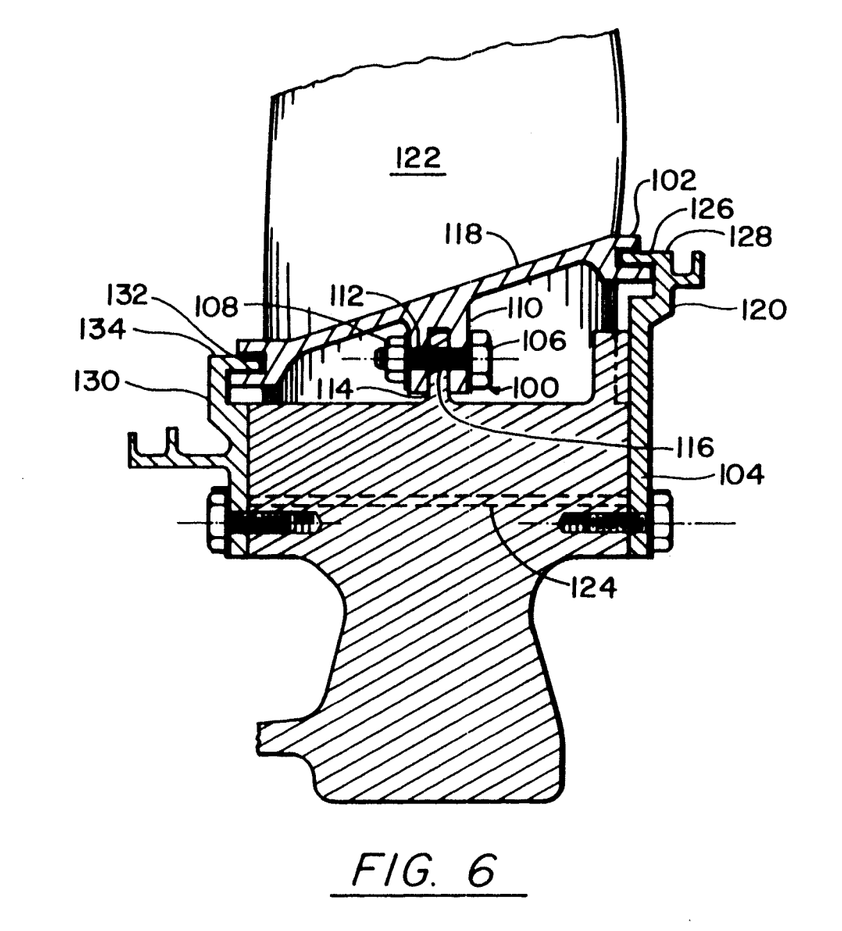
FIG. 6 is a cross-section view of a rotor blade assembly in accordance with an alternative embodiment having a supplemental mechanical fastener.

Referring to FIG. 6, an alternative embodiment which provides means of supplemental retention is shown. In this embodiment, the supplemental retention means is a mechanical fastener 100 disposed between a platform 102 and a disk 104. The mechanical fastener is comprised of a threaded bolt 106, a nut 108, a pair of platform extensions 110 having apertures 112 adapted to permit engagement with the bolt 106, and a disk extension 114 having an aperture 116 adapted to permit engagement with the bolt 106. The engagement of the bolt 106 with the platform extensions 110 and disk extension 114 provides supplemental retention of the platform 102 to the disk 104. The mechanical fastener 100 is disposed in close proximity to the axial center 118 of the platform 102, which is the region of the highest bending moments.

For the alternative embodiment illustrated in FIG. 6, additional steps in the assembly procedure are required. First, a rear cover plate 120 is slid over the disk 104 and positioned immediately downstream of the disk 104. Second, each rotor blade 122 is slid into a retaining slot 124. Third, each platform 102 is placed into position by radially lowering each platform 102 between adjacent rotor blades 122. Fourth, the mechanical fasteners 100 are engaged with the apertures 112 and the aperture 116. Fifth, a tongue 128 of the rear cover plate 120 is engaged with a groove 126 of the platform. Sixth, a front cover plate 130 is positioned onto the disk 104 and an upstream facing groove 132 is engaged with a tongue 134 of the front cover plate 130. Finally, the front cover plate 130 and rear cover plate 120 are fastened to the disk 104.

Although the invention is disclosed as particularly useful in rotor blade assemblies of compressors, it should be noted that the invention is equally applicable to fans, turbines, or any other rotating assembly requiring platforms between adjacent rotor blades.

Although the invention has been shown and described with respect to exemplary embodiments thereof, it should be understood by those skilled in the art, that various changes, omissions and additions may be made therein and thereto, without departing from the spirit and scope of the invention.

We claim:

1. For a rotary machine having a longitudinal axis, a stator structure disposed about the axis, and an annular flowpath defining a passage for working fluid, the flowpath extending axially through the rotary machine and inwardly of the stator structure, a rotor assembly which comprises:

a rotor disk having an outer portion which includes retaining means, and having an inner portion which is circumferentially and radially continuous;

a plurality of rotor blades, each of said rotor blades having a root portion disposed circumferentially on the disk by engagement with said retaining means and having an airfoil portion radially extending through the flowpath;

a plurality of platforms, each of said platforms positioned between adjacent rotor blades, said plurality of platforms adapted to provide a radially inner flow surface for the flowpath and to impede communication between said root portion and the flowpath;

means to secure said plurality of platforms to said inner portion of said disk whereby at least a portion of the load of said plurality of platforms is transferred directly to said inner portion, the securing means including a front cover plate which engages said inner portion of said disk, positioned downstream of said rotor blades, and having second attachment means adapted to engage said plurality of platforms and a rear cover plate which engages said inner portion of said disk, positioned downstream of said rotor blades, and having second attachment means adapted to engage said plurality of platforms; and mechanical fastening means adapted to supplementally secure said platform to said disk.

2. The rotor assembly according to claim 1, wherein each of said platforms includes an upstream facing groove and wherein said first attachment means includes a downstream extending tongue adapted to engage said upstream facing groove.

3. The rotor assembly according to claim 1, wherein each of said platforms includes a downstream facing groove and wherein said second attachment means includes an upstream extending tongue adapted to engage said downstream facing groove.

4. The rotor assembly according to claim 1, wherein said retaining means includes a plurality of circumferentially spaced and axially oriented slots, each of said slots being dove-tail shaped in circumferential cross-section, and wherein each of said plurality of root portions is configured to complement one of said slots.

5. The rotor assembly according to claim 1, further comprising sealing means between said rotor assembly and axially adjacent stator structure.

6. The rotor assembly according to claim 1, further comprising sealing means between said rotor assembly and axially upstream stator structure, and wherein said sealing means includes a knife-edge seal disposed on said front cover plate and extending radially outward, said knife-edge seal adapted to engage stator structure axially upstream of said rotor assembly.

7. The rotor assembly according to claim 1, further comprising sealing means between said rotor assembly and axially downstream stator structure, and wherein said sealing means includes a knife-edge seal disposed on said rear cover plate and extending radially outward, said knife-edge seal adapted to engage stator structure axially downstream of said rotor assembly.

8. The rotor assembly according to claim 1, further comprising sealing means disposed between each of said platforms and each adjacent rotor blade, said sealing means adapted to prevent working fluid from flowing radially inward between said platforms and said rotor blades.

9. A rotary machine extending circumferentially about a longitudinal axis, having a stator structure disposed about the axis, and an annular flowpath extending axially through said rotary machine and inwardly of the stator structure, said rotary machine including a rotor assembly comprised of:

a disk extending circumferentially about the axis and adapted to rotate about the axis, said disk having an outer portion which includes a plurality of retaining slots axially oriented and circumferentially spaced about said disk and having an inner portion which is circumferentially and radially continuous;

a plurality of rotor blades, each of said rotor blades having a root portion which is engaged with one of said retaining slots to secure said rotor blades to said disk and having an airfoil portion radially extending through the flowpath, said airfoil portion having a concave pressure surface and a convex suction surface;

an annular front cover plate which engages said inner portion of said disk, positioned upstream of said rotor blades, said front cover plate having first attachment means adapted to engage a platform;

an annular rear cover plate which engages said inner portion of said disk, positioned downstream of said rotor blades, said rear cover plate having second attachment means adapted to engage a platform; and a plurality of platforms positioned between adjacent rotor blades, each of said platforms adapted to extend axially and circumferentially between the adjacent rotor blades, each of said platforms engaged with said first attachment means and engaged with said second attachment means, said engagements adapted to retain said platforms to said disk, said platforms adapted to form a radially inner flow surface for the flowpath and which, in conjunction with said front cover plate and said rear cover plate, impedes communication between said root portion of said rotor blades and the flowpath, and wherein each of said platforms includes means of mechanically fastening adapted to supplementally secure each of said platforms to said disk.

10. The rotary machine according to claim 9, wherein each of said platforms includes an upstream facing groove and a downstream facing groove, said first attachment means includes a downstream extending tongue adapted to engage said upstream facing groove, and said second attachment means includes an upstream extending tongue adapted to engage said downstream facing groove.

11. The rotary machine according to claim 9, further comprising sealing means disposed between each of said platforms and each adjacent rotor blade, said sealing means adapted to impede communication between the flowpath and the root portions.

12. The rotary machine according to claim 9, wherein said root portion is dove-tail shaped in cross-section and wherein said retaining slot is configured to complement the shape of the root portion.

13. The rotary machine according to claim 9, further comprising means for sealing between said rotor assembly and axially adjacent stator structure.

14. The rotary machine according to claim 13, wherein said sealing means is comprised of a knife-edge seal disposed on said front cover plate and extending radially outward, said knife-edge seal adapted to engage stator structure axially upstream of said rotor assembly.

15. The rotary machine according to claim 13, wherein said sealing means includes a knife-edge seal disposed on said rear cover plate and extending radially outward, said knife-edge seal adapted to engage stator structure axially downstream of said rotor assembly.

16. A method of installing a rotor blade assembly to a disk extending circumferentially about a longitudinal axis and having blade retention means, wherein the rotor blade assembly is comprised of a plurality of rotor blades, a plurality of platforms, each platform having a first groove and a second groove, a front cover plate having a circumferentially oriented and longitudinally extending tongue, a rear cover plate having a circumferentially oriented and longitudinally extending tongue, means for fastening the front cover plate and the rear cover plate to the disk, and securing means adapted to engage the disk and platforms to provide supplemental retention of the platform to the disk, the method comprising:
 (a) positioning the rear cover plate on the disk;
 (b) mounting each of the rotor blades onto the disk by engaging the rotor blades with the retaining means;
 (c) positioning each of the platforms by radially lowering each of the platforms between adjacent rotor blades;
 (d) securing the platforms to the disk by engaging the securing means with each platform and the disk;
 (e) engaging the tongue of the rear cover plate with the second groove of each platform;
 (f) engaging the tongue of the front cover plate with the first groove of each platform; and
 (g) fastening the front and rear cover plates to the disk by engaging the fastening means with the front and rear cover plates and the disk.

17. The method according to claim 16, wherein the blade retaining means includes a plurality of retaining slots axially oriented and circumferentially spaced on the disk, wherein the blades include a root portion adapted to engage the retaining slots, and wherein the step of securing each of the rotor blades onto the disk is comprised of engaging the root portion of each rotor blade with a retaining slot.

18. A method of securing a rotor blade assembly to a disk extending circumferentially about a longitudinal axis, the disk having blade retaining means and a live rim area defined by a circumferentially continuous portion of the disk, the rotor blade assembly including a plurality of rotor blades and a plurality of platforms adapted to extend axially and circumferentially between the blades in an assembled condition, the platforms having a first axial end, a second axial end, and securing means adapted to engage the disk and platforms to provide retention of the platform to the disk, the method comprising:
 (a) attaching each rotor blade to the disk by engaging the blade with the retaining means;
 (b) disposing a platform between each pair of adjacent rotor blades;
 (c) securing the platforms to the disk by engaging the securing means with each platform and the disk;
 (d) attaching the first axial end of the platform to the live rim area of the disk; and
 (e) attaching the second axial end of the platform to the live rim area of the disk.

19. The method according to claim 18, wherein the blade retaining means includes a plurality of retaining slots axially oriented and circumferentially spaced on the disk, wherein each blade includes a root portion adapted to engage the retaining slots, and wherein the step of attaching each of the rotor blades to the disk is comprised of engaging the root portion of each rotor blade with a retaining slot.

* * * * *